(12) United States Patent
Lee et al.

(10) Patent No.: US 7,910,249 B2
(45) Date of Patent: Mar. 22, 2011

(54) ADDITIVE FOR NONAQUEOUS ELECTROLYTE AND SECONDARY BATTERY USING THE SAME

(75) Inventors: Ho Chun Lee, Daejeon (KR); Tae Yoon Park, Daejeon (KR); Yong Su Choi, Cheongju-si (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 1164 days.

(21) Appl. No.: 11/479,305

(22) Filed: Jun. 30, 2006

(65) Prior Publication Data

US 2007/0015062 A1    Jan. 18, 2007

(30) Foreign Application Priority Data

Jul. 1, 2005    (KR) .................. 10-2005-0059252

(51) Int. Cl.
   *H01M 10/056* (2010.01)
(52) U.S. Cl. ........................................ 429/329
(58) Field of Classification Search ............. 429/329
   See application file for complete search history.

(56) References Cited

U.S. PATENT DOCUMENTS

| | | |
|---|---|---|
| 5,326,887 A | 7/1994 | Di Cosimo et al. |
| 6,432,586 B1 | 8/2002 | Zhang |
| 2002/0102455 A1 | 8/2002 | Daroux et al. |
| 2005/0170257 A1 | 8/2005 | Kim et al. |
| 2005/0255769 A1 | 11/2005 | Henninge et al. |
| 2006/0286446 A1 | 12/2006 | Chun et al. |

FOREIGN PATENT DOCUMENTS

| | | |
|---|---|---|
| CN | 1362711 A | 8/2002 |
| JP | 07-078634 | 3/1995 |
| JP | 07-192761 | 7/1995 |
| JP | 2000-331709 | 11/2000 |
| JP | 2005322610 A * | 11/2005 |
| KR | 10-2001-0057369 | 7/2001 |

OTHER PUBLICATIONS

IPDL Machine Translation of JP 2005-322610A, Nov. 2005.*
IPDL Machine Translation of JP 07-192761A, Jul. 1995.*
Machine translation of the detailed description of JP 2005-322610 A.*
Certified translation of JP 2005-322610A (Nov. 2005).*
Certified translation of JP 07-192761A (Jul. 1995).*
International Search Report for International Application No. PCT/KR2006/002548; International Filing Date Jun. 30, 2006; Date of Mailing Oct. 12, 2006.

* cited by examiner

*Primary Examiner* — Gregg Cantelmo
(74) *Attorney, Agent, or Firm* — Cantor Colburn LLP

(57) ABSTRACT

Disclosed is an electrolyte for a battery, which comprises: (a) an electrolyte salt; (b) a solvent for electrolyte; and (c) a compound represented by the following formula 1:

[Formula 1]

(I)

wherein R is a halogen atom, or a halogen-substituted or non-substituted C1~C10 alkyl group or alkenyl group. An electrode comprising a passivation layer partially or totally formed on a surface thereof, wherein the passivation layer comprises a compound represented by the following Formula 1 or a chemical reaction product thereof, and a secondary battery using the electrolyte and/or the electrode are also disclosed. The compound can improve the initial charge/discharge efficiency and cycle life characteristics of a secondary battery, and can inhibit a battery from swelling under high-temperature storage conditions.

12 Claims, 1 Drawing Sheet

ADDITIVE FOR NONAQUEOUS ELECTROLYTE AND SECONDARY BATTERY USING THE SAME

This application claims the benefit of the filing date of Korean Patent Application No. 10-2005-0059252, filed on Jul. 1, 2005, in the Korean Intellectual Property Office, the disclosure of which is incorporated herein in its entirely by reference.

TECHNICAL FIELD

The present invention relates to an additive for non-aqueous electrolytes, which can improve the cycle life characteristics, charge/discharge efficiency and high-temperature storage characteristics of a secondary battery. The present also relates to a non-aqueous electrolyte secondary battery comprising the same additive.

BACKGROUND ART

Recently, interests in energy storage technology have been gradually increased. As the use of batteries is enlarged to applications for the storage of energy for portable telephones, camcorders, notebook computers, personal computers and electric vehicles, efforts on the research and development of batteries are increasingly embodied. In this view, the field of electrochemical devices receives the greatest attention, and among them, interests in the development of chargeable/dischargeable secondary batteries are focused. More recently, in the development of such batteries, active studies have been conducted to design a novel electrode and battery, which provide an improved capacity density and specific energy.

Among secondary batteries which are now in use, lithium secondary batteries developed in the early 1990s are in the spotlight due to the advantages of higher drive voltages and far greater energy densities than those of conventional batteries, such as Ni-MH, Ni—Cd and sulfuric acid-lead batteries. To obtain such a high drive voltage, it is necessary to provide an electrolyte composition that is stable in a charge/discharge voltage ranging from 0 to 4.2V.

A lithium secondary battery includes a cathode, an anode and an electrolyte. Upon the first charge cycle, lithium ions are deintercalated from a cathode active material. Then, the lithium ions are intercalated into an anode active material such as carbon particles, and are deintercalated from the anode active material upon discharge. In this manner, lithium ions transfer energy while they reciprocate between the cathode and the anode, thereby allowing the battery to be charged/discharged. Such lithium batteries show a problem in that they causes degradation in the battery quality during repeated charge/discharge cycles. The aforementioned problem becomes more serious as the battery has a higher capacity density. Moreover, although there may be a difference depending on the kind of the electrolyte used in a battery, in most cases, the electrolyte may decompose on the surface of the cathode and/or the anode, resulting in degradation in the quality and safety of the battery.

To solve the above problems, there has been a continuous need for a method of improving the cycle life characteristics of a battery by using an additive for non-aqueous electrolytes.

Japanese Patent Publication No. 2000-331709 disclose the use of a lactide as an additive for electrolytes in a method of increasing the charge/discharge efficiency of a lithium secondary battery and improving the cycle life characteristics of a lithium secondary battery. In this patent, it is thought that the lactide is effective for inhibiting the decomposition of an electrolyte in an anode formed of graphite.

Additionally, Japanese Laid-Open Patent No. 1995-192761 discloses the use of a lactide as an additive for electrolytes in a method of inhibiting the self-discharge of a lithium secondary battery and improving the high-temperature storage characteristics and cycle life characteristics of a lithium secondary battery. In this case, it is thought that the lactide inhibits the production of HF in an electrolyte by removing moisture.

BRIEF DESCRIPTION OF THE DRAWINGS

The foregoing and other objects, features and advantages of the present invention will become more apparent from the following detailed description when taken in conjunction with the accompanying drawing in which.

DISCLOSURE OF THE INVENTION

Figure 1:
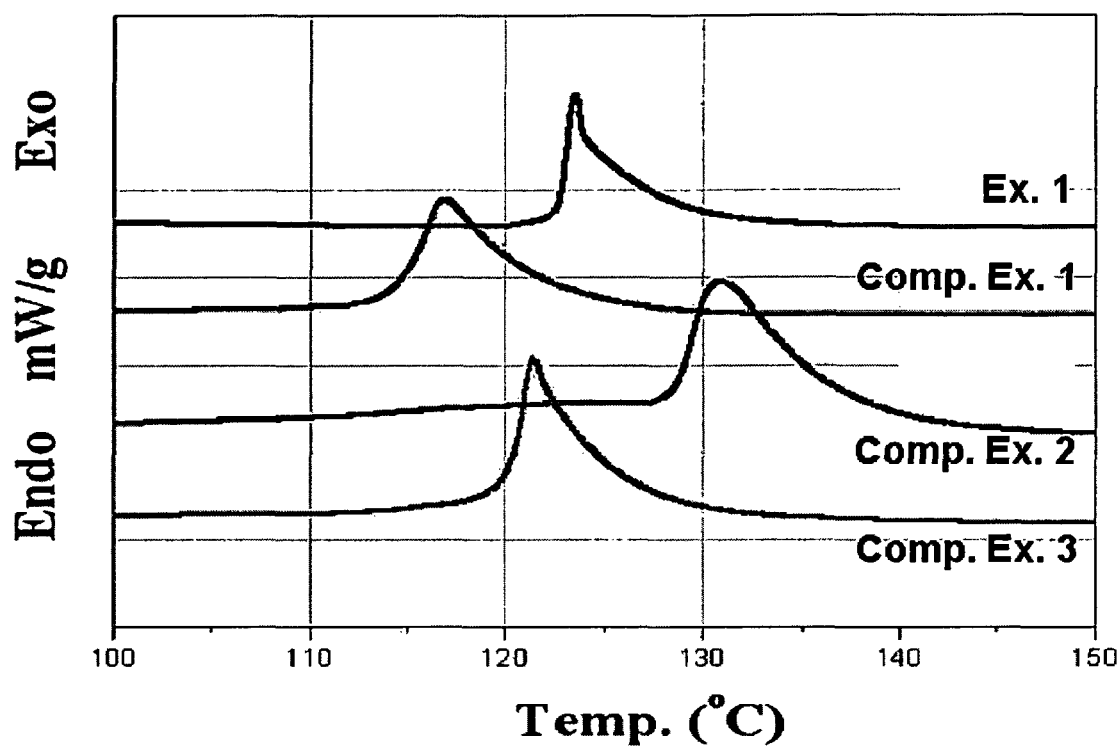
FIG. 1 is a graph showing the results of DSC (differential scanning calorimetry) of each of the anode active materials collected from the lithium secondary batteries according to Example 1 and Comparative Examples 1~3, after they are subjected to charge/discharge cycles.

Therefore, the present invention has been made in view of the above-mentioned problems. The inventors of the present invention have found that when a lactide compound represented by the following Formula II is used as an additive for electrolytes in a lithium secondary battery, the lithium secondary shows an overall quality that varies significantly depending on the types and numbers of the substituents (for example, $R_1$~$R_4$) present in the compound:

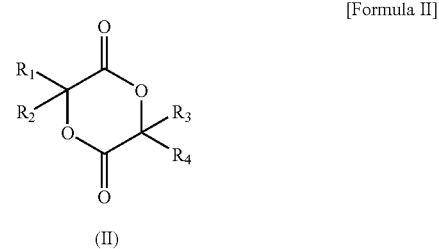

[Formula II]

(II)

Particularly, when only one non-hydrogen substituent is introduced into the compound, among the substituents represented by $R_1$~$R_4$, it can be seen that the resultant lithium secondary battery using the electrolyte comprising the additive shows an excellent overall quality, including charge/discharge efficiency, cycle life characteristics and high-temperature characteristics.

Therefore, it is an object of the present invention to provide a non-aqueous electrolyte comprising an additive for electrolytes that can improve the quality of a battery. It is another object of the present invention to provide a secondary battery comprising the above non-aqueous electrolyte.

According to an aspect of the present invention, there is provided an electrolyte for a secondary battery, which comprises: (a) an electrolyte salt; (b) a solvent for electrolyte; and (c) a compound represented by the following formula 1:

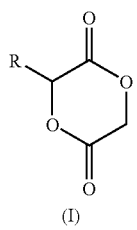

[Formula 1]

(I)

wherein R is a halogen atom, or a halogen-substituted or non-substituted C1~C10 alkyl group or alkenyl group.

According to another aspect of the present invention, there is provided an electrode having a passivation layer partially or totally formed on the surface thereof, wherein the passivation layer comprises the compound represented by the above Formula 1 or a chemical reaction product thereof. According to still another aspect of the present invention, there is provided a lithium secondary battery comprising the same electrode.

Hereinafter, the present invention will be explained in more detail.

The present invention is characterized by using a lactide-like compound, i.e., a compound represented by the above Formula 1, into which only one non-hydrogen substituent (R) is introduced, as one of the constitutional elements forming a non-aqueous electrolyte for a battery.

The compound represented by Formula 1, into which only one non-hydrogen substituent is introduced, shows a lower reduction potential (a higher reduction potential in the case of a half-cell) compared to a currently used lactide compound (Formula 3) having at least two non-hydrogen substituents introduced thereto. Additionally, the compound according to the present invention shows improved physical, chemical and thermal stability, compared to a currently used glycolide compound (Formula 2) having no non-hydrogen substituent introduced thereto.

Due to the above advantages, the lithium secondary battery according to the present invention can provide improved cycle life characteristics, long lifespan and high-temperature storage characteristics.

1) Quality of a battery mainly depends on the constitutional elements of an electrolyte and a solid electrode interface (SEI), formed via the reaction between the electrolyte and an electrode.

In a lithium secondary battery, during the first charge cycle, carbon particles, used as an anode active material, react with an electrolyte on the surface of the anode to form a solid electrolyte interface (SEI) film. The SEI film formed as described above serves to inhibit side reactions between carbonaceous materials and an electrolyte solvent and structural collapse of an anode material, caused by co-intercalation of an electrolyte solvent into the anode active material, and functions sufficiently as a lithium ion tunnel, thereby minimizing degradation in the quality of a battery. However, SEI films formed by a conventional carbonate-based organic solvent are weak, porous and coarse so that lithium ion conduction cannot be made smoothly. Thus, under these circumstances, the amount of reversible lithium decreases and irreversible reactions increase during repeated charge/discharge cycles, resulting in degradation in the capacity and cycle life characteristics of a battery.

On the contrary, according to the present invention, the compound represented by Formula 1, which shows a lower reduction potential (a higher reduction potential in the case of a half-cell), when compared to a lactide compound having at least two non-hydrogen substituents introduced thereto, is used in addition to a conventional carbonate solvent for electrolyte. Hence, upon the initial charge cycle of a battery, the compound forms a firm and dense SEI film on the surface of an anode material in advance of the other constitutional elements. As a result, it is possible to prevent the co-intercalation of the carbonate solvent into the electrode active material layer having a layered structure or the side reactions including the decomposition of the solvent, so that the irreversible capacity of the battery can be decreased. Therefore, it is possible to increase the initial charge/discharge efficiency of the battery and to provide excellent cycle life characteristics during charge/discharge cycles for a long period of time, because the SEI film formed as mentioned above is a passivation layer having low chemical reactivity and allowing selective intercalation/deintercalation of lithium ions ($Li^{+}$).

(2) Conventional lithium secondary batteries cause rapid degradation in the battery quality, particularly under high-temperature conditions. This is because the SEI film formed on the surface of an anode collapses rapidly, resulting in an increase in the side reaction between the electrode and an electrolyte increase, gas generation caused by decomposition of an electrolyte, and an increase in the thickness (resistance) of an electrode.

On the contrary, the SEI film that is collapsed under high-temperature conditions may be regenerated promptly at a low potential by the compound of Formula 1, contained in the electrolyte, and the SEI film can be maintained continuously. Hence, it is possible to prevent the electrolyte from decomposing under high-temperature storage conditions, and thus to prevent an increase in the internal pressure and a swelling phenomenon of the battery. Moreover, it is also possible to inhibit side reactions between an electrode and an electrolyte, showing an increased reactivity due to the high temperature, thereby providing the battery with excellent high-temperature characteristics.

One of the constitutional elements forming the electrolyte for a battery according to the present invention is the compound represented by Formula 1.

Although the compound represented by Formula 1 has a similar structure to the glycolide compound (see the following Formula 2) and to the lactide compound (see the following Formula 3), it provides a different effect as an additive for electrolytes, when compared to the glycolide and lactide compounds. The effect of the compound represented by Formula 1 is as follows:

(i) First, the compound represented by Formula 1 shows a lower reduction potential (a higher reduction potential in the case of a half-cell), when compared to a compound having at least two non-hydrogen substituents introduced thereto, such as a lactide compound (Formula 3). Thus, it is possible to form an SEI film on the surface of an anode more easily upon the initial charge cycle, as described above. As a result, it is possible to improve the overall quality of a battery, because the irreversible capacity of the battery decreases.

The reduction potential characteristics as mentioned above may be affected largely by the following two factors: The first factor is the steric hindrance in the compound. As the number of the non-hydrogen substituents (e.g. methyl group) increase in the additive, the additive molecule become more bulky and shows an increased steric hindrance, thereby having difficulty in performing reduction. The second factor is an electronic effect. The electronic effect induces an increase in the electron density of the additive due to the electron donating capability of the non-hydrogen substituents introduced into the additive. As a result of the above two reasons, the reduction potential increases (reduction potential decreases in the case of a half-cell) as the number of non-hydrogen substituents (e.g. alkyl or alkenyl groups) increases, thereby showing difficulty in performing reduction.

Additionally, as the number of non-hydrogen substituents (e.g. alkyl or alkenyl groups) increases, steric hindrance caused by these substituents increases, and thus the resultant SEI film has a decreased density and compactness. In this case, because the SEI film shows a degraded effect as a passivation layer, an electrolyte may cause side reactions continuously, resulting in a drop in the lifespan of a battery.

In fact, it could be seen from the results of the following Experimental Examples that the compound represented by Formula 1, having only one methyl group, provides a battery with improved initial charge/discharge efficiency and cycle life characteristics, as compared to the lactide compound represented by Formula 3, having two methyl groups (see the following Tables 1 and 2).

Meanwhile, a halogen atom has a similar size to a methyl group and is an electron withdrawing group that facilitates reduction. Therefore, when a halogen atom is present in the compound represented by Formula 1, it is possible to decrease the irreversible capacity, and thus to improve the overall quality of a battery.

(ii) Additionally, the compound represented by Formula 1 has a higher thermal stability compared to the glycolide compound (Formula 2) having no non-hydrogen substituents. Hence, it is possible to significantly reduce a so-called swelling phenomenon of a battery under high-temperature storage conditions.

In general, cycle life characteristics of a battery are related to the anode of the battery, while swelling of a battery is related to the cathode of the battery. In other words, use of an additive for electrolytes, having high physical, chemical and thermal stability, decreases gas generation caused by the decomposition of the electrolyte. Therefore, it is possible to inhibit the internal pressure of a battery from increasing and the battery from swelling. For reference, it is disclosed that when the number of non-hydrogen substituents increases in the compound represented by the above Formula II, ring strain of the cyclic structure decreases and ring-opening polymerizability decreases accordingly (Polymer 39, 5581, 1998). This ultimately indicates that while the stability of a compound having non-hydrogen substituents is improved as the number of the non-hydrogen substituents increases, the corresponding compound having hydrogen atoms instead of the non-hydrogen substituents shows low physical stability. As a result, it is thought that the non-hydrogen substituents introduced into the additive for electrolytes contribute to the improvement of the thermal stability of the additive molecule. In fact, it could be seen from the results of the following Experimental Examples of the present invention that the compound represented by Formula 1 having one methyl group significantly inhibits a battery from swelling under high-temperature storage conditions, as compared to the compound represented by Formula 2 having no methyl group (see Table 3).

The amount of the compound represented by Formula 1 may vary depending on the target degree of improvement in the quality of a battery, including the initial charge/discharge efficiency and cycle life characteristics. However, the compound represented by Formula 1 is used preferably in an amount ranging from 0.5 wt % to 10 wt % based on 100 wt % of a non-aqueous electrolyte. If the compound represented by Formula 1 is used in an amount less than 0.5 wt %, it is not possible to improve the quality of a battery sufficiently. If the compound represented by Formula 1 is used in an amount greater than 10 wt %, the quality of a battery may be degraded due to an increase in the irreversible capacity of the battery.

The electrolyte for a battery, to which the compound is added, comprises conventional components widely known to one skilled in the art, for example, an electrolyte salt and an organic solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred. Non-limiting examples of the lithium salt include $LiClO_4$, $LiCF_3SO_3$, $LiPF_6$, $LiBF_4$, $LiAsF_6$, $LiN(CF_3SO_2)_2$, and mixtures thereof.

The organic solvent includes a conventional solvent known to one skilled in the art, such as a halogen-substituted or non-substituted cyclic carbonate solvent; linear carbonate solvent; ester solvent; nitrile solvent; phosphate solvent or a mixture thereof. Non-limiting examples of such organic solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone ($\gamma$-butyrolactone; GBL), methyl formate, ethyl formate, propyl formate, methyl acetate, ethyl acetate, propyl acetate, pentyl acetate, methyl propionate, ethyl propionate, propyl propionate, butyl propionate, and mixtures thereof.

Also, the present invention provides an electrode having a passivation layer partially or totally formed on the surface thereof, wherein the passivation layer comprises the compound represented by the above Formula I or a chemical reaction product thereof. Herein, the chemical reaction means oxidation and/or reduction caused by the electrochemical reactions occurring in the battery.

In the electrode, when using the above electrolyte, the compound represented by Formula 1 may be spontaneously formed on the surface of the electrode active material along with reversible lithium ions during charge/discharge cycles. Otherwise, the compound may be coated on the surface of the electrode active material, may be used as one of the materials forming the electrode, or may be coated on the surface of a preformed electrode. At this time, the passivation layer may be a solid electrolyte interface film formed partially or totally on the surface of the electrode active material by electrochemical reduction and ring-opening polymerization of the compound represented by Formula 1.

As described above, the secondary battery comprising the electrode, which includes the compound represented by Formula 1 or a chemical reaction product thereof, partially or totally formed on the surface of the electrode active material, can stabilize a carbonaceous material, transition metal and a transition metal oxide in the electrode. Also, in the above secondary battery, it is possible to effectively control the exothermic reactions caused by direct contact between the electrode surface and the electrolyte, and to retard the structural collapse of the electrode active material. Therefore, it is possible to prevent ignition and explosion of the battery caused by an increase in the internal temperature of the battery.

The electrode according to the present invention may be formed by applying an electrode active material on a current collector according to a method known to one skilled in the art. In one embodiment of such methods, electrode slurry containing a cathode active material or an anode active material is applied onto a current collector, followed by drying. At this time, a small amount of conductive agent and/or binder may be added, as necessary.

Particularly, cathode active materials may include any conventional cathode active materials currently used in a cathode of a conventional secondary battery. Particular non-limiting examples of the anode active material include: lithium transition metal composite oxides, including $LiM_xO_y$ (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium dioxide, molybdenum dioxide, etc.); or the like. Among these examples, $LiCoO_2$, $LiNiO_2$, $LiMnO_2$, $LiMn_2O_4$, Li $(Ni_aCo_bMn_c)O_2$ (wherein $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (wherein $0\leq Y<1$), Li $(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, $LiFePO_4$ or a mixture thereof is particularly preferred.

Additionally, anode active materials may include any conventional anode active materials currently used in an anode of a conventional secondary battery. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

As the binder, a currently used binder may be used. Particular non-limiting examples of the binder include PVDF (polyvinylidene fluoride) or SBR (styrene butadiene rubber).

Further, the present invention provides a secondary battery comprising: (a) a cathode; (b) an anode; (c) an electrolyte; and (d) a separator, wherein the electrolyte includes the above additive for electrolytes; and/or either or both of the cathode and the anode include a passivation layer partially or totally formed on the surface thereof, the passivation layer comprising the compound represented by Formula 1 or a reduction (oxidation) product thereof.

Preferably, the secondary battery is a lithium secondary battery, and non-limiting examples of the lithium secondary battery include a lithium metal secondary battery, a lithium ion secondary battery, a lithium polymer secondary battery or a lithium ion polymer secondary battery.

The secondary battery according to the present invention may be obtained by using a method generally known to one skilled in the art, except that the electrolyte, comprising the compound represented by Formula 1 added thereto, is used. For example, an electrode assembly is formed by using a cathode, an anode and a separator interposed between both electrodes, and then the electrolyte is injected thereto. Also, it is possible to use the electrode, to which the compound represented by Formula 1 is introduced, alone or in combination with the electrolyte comprising the additive for electrolytes added thereto.

Preferably, the separator is a porous separator. Non-limiting examples of the separator that may be used include a polypropylene-based, polyethylene-based or polyolefin-based separator, or a porous separator, into which inorganic particles are incorporated.

There is no particular limitation in the outer shape of the secondary battery obtained in the above-described manner. The secondary battery may be a cylindrical, prismatic, pouch-type or coin-type battery.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

1-1. Preparation of Electrolyte

1M $LiPF_6$ dissolved in a mixed solvent of EC:PC:DEC (2:1:7) was used as an electrolyte, and the compound represented by the following formula was added thereto in an amount of 2.0 wt %:

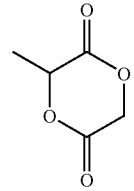

1-2. Manufacture of Half Cell

Artificial graphite was used as a cathode and lithium metal foil was used as an anode to provide a coin-like half-cell in a conventional manner. To the half-cell, the electrolyte obtained as described in Example 1-1 was injected.

1-3. Manufacture of Full Cell

A cathode comprising $LiCoO_2$ and an anode comprising artificial graphite were used to provide an Al-pouch type battery having a thickness of 5.0 mm and a capacity of 1360 mAh in a conventional manner. To the full cell, the electrolyte obtained as described in Example 1-1 was injected.

COMPARATIVE EXAMPLE 1

A half cell and a full cell were obtained by using the same methods as Example 1-2 and Example 1-3, except that the glycolide compound represented by the following Formula 2 was used instead of the above compound:

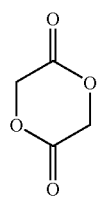

[Formula 2]

COMPARATIVE EXAMPLE 2

A half cell and a full cell were obtained by using the same methods as Example 1-2 and Example 1-3, except that the lactide compound represented by the following Formula 2 was used instead of the above compound:

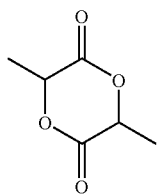

[Formula 3]

COMPARATIVE EXAMPLE 3

A half cell and a full cell were obtained by the same methods as Example 1-2 and Example 1-3, except that no additive for electrolytes was used.

EXPERIMENTAL EXAMPLE 1

Evaluation of Charge/Discharge Efficiency of Battery

The following test was performed to evaluate the initial charge/discharge efficiency of a lithium secondary battery according to the present invention.

A coin-like half cell comprising an additive for electrolytes having one non-hydrogen substituent (e.g. methyl group) according to Example 1 was used as a sample. As controls, the coin-like half cells comprising an additive for electrolytes having no non-hydrogen substituent, an additive for electrolytes having at least two non-hydrogen substituents, or no additive for electrolytes, according to Comparative Examples 1 to 3, were used. Each cell was subjected to a charge/discharge cycle at 0.05C, and was measured for the initial charge/discharge efficiency. The results are shown in the following Table 1.

After the test, a battery having a lower number of non-hydrogen substituents in the compound used as an additive for electrolytes shows a higher initial charge/discharge efficiency. This indicates that when at most one non-hydrogen substituent is introduced into the additive compound, the compound shows a lower reduction potential and decomposes more easily upon the first charge cycle, thereby forming a firm and dense inactive film, compared to a lactide compound having at least two non-hydrogen substituents, thereby improving the initial charge/discharge efficiency of a battery.

TABLE 1

|  | Number of methyl groups at α-carbon atoms | Initial charge/discharge efficiency (%) |
|---|---|---|
| Ex. 1 | 1 | 93.9 |
| Comp. Ex. 1 | 0 | 94.3 |
| Comp. Ex. 2 | 2 | 91.8 |
| Comp. Ex. 3 | NA | 90.5 |

EXPERIMENTAL EXAMPLE 2

Evaluation of Cycle Life Characteristics of Battery

The following test was performed to evaluate the cycle life characteristics of a lithium secondary battery according to the present invention.

The lithium secondary battery (full cell) comprising an additive for electrolytes having one non-hydrogen substituent (e.g. methyl group), according to Example 1, was used as a sample. As controls, the batteries comprising an additive for electrolytes having no non-hydrogen substituent, an additive for electrolytes having at least two non-hydrogen substituents, or no additive for electrolytes, according to Comparative Examples 1 to 3, were used. Each battery 15 was subjected to 200 times of charge/discharge cycles under 0.5C at 45° C. After 200 cycles, the discharge capacity and the capacity retention based on the initial capacity were measured. The results are shown in the following Table 2.

TABLE 2

|  | Discharge capacity after 200 cycles at 45☐ (mAh) | Capacity retention based on the initial capacity after 200 cycles at 45☐ (%) |
|---|---|---|
| Ex. 1 | 1034 | 76.0 |
| Comp. Ex. 1 | 1090 | 80.1 |
| Comp. Ex. 2 | 963 | 70.8 |
| Comp. Ex. 3 | 949 | 69.8 |

Like the above Experimental Example 1, it can be seen that as the number of non-hydrogen substituents in the compound used as an additive for electrolytes, decreases, cycle life characteristics of the battery are improved. This indicates that a compound having a smaller number of non-hydrogen substituents forms an SEI film having higher quality on the surface of an anode.

EXPERIMENTAL EXAMPLE 3

Evaluation of High-Temperature Storage Characteristics of Battery

The following test was performed to evaluate the high-temperature storage characteristics of a lithium secondary battery according to the present invention.

The lithium secondary battery (full cell) comprising an additive for electrolytes having one non-hydrogen substituent (e.g. methyl group), according to Example 1, was used as a sample. As controls, the batteries comprising an additive for electrolytes having no non-hydrogen substituent, an additive for electrolytes having at least two non-hydrogen substituents, or no additive for electrolytes, according to Comparative Examples 1 to 3, were used. Each battery was stored at 90° C. for about 6 hours, after being fully charged. Then, each cell was measured for its thickness and thickness gain. The results are shown in the following Table 3.

After the test, the battery using no additive for electrolytes according to Comparative Example 3, and the cells using the additive having at least one non-hydrogen substituent according to Example 1 and Comparative example 2 show a thickness gain of about 0.54~0.55 mm after storing them at a high temperature. However, the battery according to Comparative Example 1, which provides the most excellent results for the initial capacity and the cycle life characteristics, shows a higher thickness gain compared to the above batteries by at least three times. This indicates that when a compound (glycolide) having no non-hydrogen substituent is used as an additive for electrolytes, a battery comprising the electrolyte may cause a rapid swelling phenomenon due to the generation of a large amount of gas under high-temperature storage conditions.

TABLE 3

| | Thickness after storing at high temperature (mm) | Thickness gain after storing at high temperature (mm) |
|---|---|---|
| Ex. 1 | 5.79 | 0.54 |
| Comp. Ex. 1 | 7.05 | 1.80 |
| Comp. Ex. 2 | 5.80 | 0.55 |
| Comp. Ex. 3 | 5.79 | 0.54 |

As can be seen from the above results of Experimental Examples 1 to 3, the compound represented by Formula 1, which has one non-hydrogen substituent introduced thereto, can provide a battery with excellent overall quality (e.g., initial charge/discharge efficiency, cycle life characteristics, and high-temperature storage characteristics).

EXPERIMENTAL EXAMPLE 4

Determination of SEI Film Formed via Reaction of Additive on Anode

The following test was performed to determine the formation of an SEI film from the additive for electrolytes according to the present invention on the surface of an anode.

The lithium secondary battery (full cell) comprising an additive for electrolytes having one non-hydrogen substituent (e.g. methyl group), according to Example 1, was used as a sample. As controls, the batteries comprising an additive for electrolytes having no non-hydrogen substituent, an additive for electrolytes having at least two non-hydrogen substituents, or no additive for electrolytes, according to Comparative Examples 1 to 3, were used. Each battery was subjected to three times of charge/discharge cycles at 0.2C, and then the anode was collected from each battery in a discharged state. The anode was analyzed by DSC (differential scanning calorimetry). The results are shown in FIG. 1. It is generally accepted that the heat emission peak appearing in the range of 100~140° C. is the result of the thermal collapse of the SEI film on the surface of the anode.

As can be seen from FIG. 1, exothermic reactions occur on the anodes in a different manner depending on the kind of the additive for electrolytes. Additionally, the following Table 4 shows the starting temperature of the heat emission caused by the thermal collapse of the SEI film. In Table 4, a higher temperature indicates that the SEI film formed on the corresponding anode has a higher thermal stability.

TABLE 4

| | Number of methyl groups at α-carbon atoms | Heat emission starting temperature (° C.) |
|---|---|---|
| Ex. 1 | 1 | 117 |
| Comp. Ex. 1 | 0 | 104 |
| Comp. Ex. 2 | 2 | 121 |
| Comp. Ex. 3 | NA | 110 |

After the test, the batteries using an additive for electrolytes having at least one non-hydrogen substituent according to Example 1 and Comparative Example 2 show a higher heat emission starting temperature, compared to the battery using no additive for electrolytes according to Comparative Example 3. However, the battery using an additive having no non-hydrogen substituent according to Comparative Example 1 shows a low starting temperature. This indicates that the SEI film formed on the anode by the compound (glycolide) having no non-hydrogen substituent has a relatively poor thermal stability. Further, all of the above experimental data demonstrates that the additive for electrolytes according to the present invention participates in the formation of the SEI film on an anode.

INDUSTRIAL APPLICABILITY

As can be seen from the foregoing, the additive for non-aqueous electrolytes according to the present invention is effective for the improvement of the charge/discharge efficiency and cycle life characteristics of a secondary battery. Therefore, the additive according to the present invention can improve the overall quality of a secondary battery.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An electrolyte for a battery, which comprises: (a) an electrolyte salt; (b) a solvent for electrolyte; and (c) a compound represented by the following formula 1:

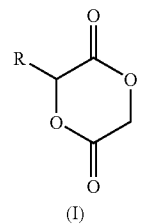

[Formula 1]

wherein R is a halogen atom, or a halogen-substituted or non-substituted C1~C10 alkyl group or alkenyl group.

2. The electrolyte according to claim 1, which comprises the compound represented by Formula 1 in an amount of 0.5~10 wt % based on 100 wt % of the electrolyte.

3. The electrolyte according to claim 1, wherein the electrolyte salt (a) is a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof; and solvent (b) is at least one solvent selected from the group consisting of halogen-substituted or non-substituted cyclic carbonate solvents, linear carbonate solvents, ester solvents, nitrile solvents, and phosphate solvents.

4. An electrode comprising a passivation layer partially or totally formed on a surface thereof, wherein the passivation layer comprises a compound represented by the following Formula 1 or a chemical reaction product thereof:

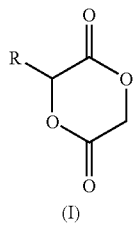

(I)

wherein R is a halogen atom, or a halogen-substituted or non-substituted C1~C10 alkyl group or alkenyl group.

5. The electrode according to claim 4, wherein the passivation layer includes a solid electrolyte interface (SEI) film, which is formed partially or totally on the surface of an electrode active material via electrochemical reduction and ring-opening polymerization of the compound represented by Formula 1.

6. The electrode according to claim 4, which is an anode.

7. A lithium secondary battery comprising (a) a cathode; (b) an anode; (c) a separator; and (d) an electrolyte as defined in claim 1, which comprising (a) an electrolyte salt; (b) a solvent for electrolyte; and (c) a compound represented by the following formula 1:

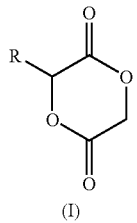

(I)

wherein R is a halogen atom, or a halogen-substituted or non-substituted C1~C10 alkyl group or alkenyl group.

8. The lithium secondary battery according to claim 7, which comprises the compound represented by Formula 1 in an amount of 0.5~10 wt % based on 100 wt % of the electrolyte.

9. The lithium secondary battery according to claim 7, wherein the electrolyte salt (a) is a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof; and solvent (b) is at least one solvent selected from the group consisting of halogen-substituted or non-substituted cyclic carbonate solvents, linear carbonate solvents, ester solvents, nitrile solvents, and phosphate solvents.

10. A lithium secondary battery comprising (a) a cathode; (b) an anode; (c) a separator; and (d) an electrolyte, wherein either or both of the cathode and the anode are the electrode as defined in claim 4, which comprises a passivation layer partially or totally formed on a surface thereof, wherein the passivation layer comprises a compound represented by the following Formula 1 or a chemical reaction product thereof:

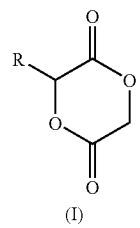

(I)

wherein R is a halogen atom, or a halogen-substituted or non-substituted C1~C10 alkyl group or alkenyl group.

11. The lithium secondary battery according to claim 10, wherein the passivation layer includes a solid electrolyte interface (SEI) film, which is formed partially or totally on the surface of an electrode active material via electrochemical reduction and ring-opening polymerization of the compound represented by Formula 1.

12. The lithium secondary battery according to claim 10, wherein the electrode is an anode.

* * * * *